Oct. 12, 1943.         A. P. DILLOW         2,331,600
WINDSHIELD SHIELD
Filed March 9, 1942

Arthur P. Dillow,
INVENTOR.

BY
Victor J. Evans & Co.
ATTORNEYS

Patented Oct. 12, 1943

2,331,600

UNITED STATES PATENT OFFICE 2,331,600

WINDSHIELD SHIELD

Arthur P. Dillow, Curtis Bay, Md.

Application March 9, 1942, Serial No. 433,994

2 Claims. (Cl. 296—84)

My invention relates to automotive vehicle windshields, and has among its objects and advantages the provision of an improved shield designed to provide a detachable covering for the vehicle windshield to prevent the accumulation of snow, frost, sleet or dust on the windshield when the vehicle is idle for an extended period of time.

In the embodiment selected to illustrate my invention, the waterproof shield 10 takes the general contour of the vehicle windshield 12, the shield 10 being of larger area than the windshield 12 so as to have overlapping relationship with the vehicle body about the entire perimeter of the shield, as at 14.

Figure 1:
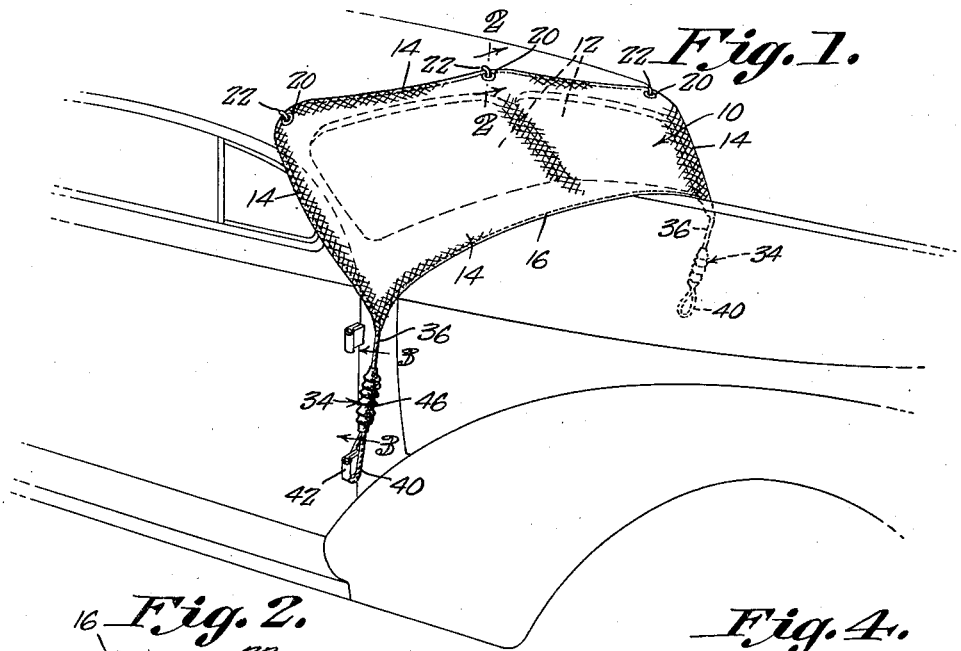
Figure 1 is a perspective view of a portion of an automobile illustrating my invention applied thereto.
Figure 2:
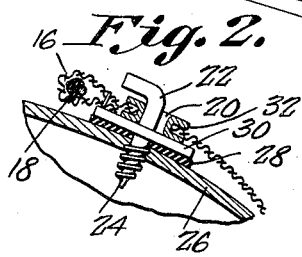
Figure 2 is an enlarged sectional view taken along the line 2—2 of Figure 1.

A hem 16 is provided about the entire perimeter of the shield 10, within which hem is arranged a reinforcing cord 18. Along the top edge margin of the shield 10 are provided eyelets 20 for the reception of attaching pins 22 secured to the vehicle body. In Figure 2, the pin 22 has a hook end which extends through the eyelet 20 and includes a self-threading screw shank 24 threaded through the body wall 26. A rubber sealing washer 28 is mounted on the shank 24 and is interposed between the wall 26 and a flange 30 on the pin. All the pins 22 are identical in construction.

The eyelets 20 comprise metallic grommets 32 having engagement with the pins 22 to provide a strong construction. The hook portions of the pins extend rearwardly of the vehicle so as to provide firm securement for the shield in connection with pulling means acting on the lower corners of the shield for holding the latter tautly in position across the windshield.

Figure 3:
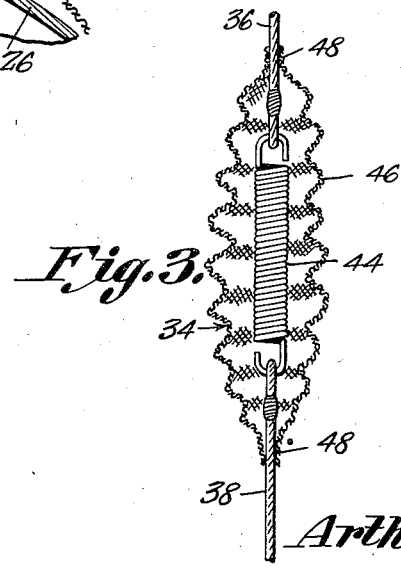
Figure 3 is an enlarged sectional view taken along the line 3—3 of Figure 1.

Two tensioning devices 34 are employed, each of which includes a cord section 36 attached to a lower corner of the shield 10 and a cord section 38 having a loop 40 through which the door hinge 42 may be passed to constitute a fastening means for the tensioning member. A tension spring 44 connects the cord sections 36 and 38, as in Figure 3, which spring is enclosed in a fabric covering 46 of tubular formation. The ends of the covering 46 are secured at 48 to the respective cord sections 36 and 38, and the covering is of considerable length so as to fold in the manner of Figure 3 whereby the covering may be extended sufficiently far to place the spring 44 under the necessary tension as well as to facilitate manipulation of the fastening member. The tensioning members are also of such lengths as to exert a pull on the shield 10 when it is in position on the vehicle. Thus the shield is held firmly in position to resist strong winds as well as to hold the shield snugly against the body margins about the windshield 12 to prevent the entrance of objectionable amounts of snow, dust, and the like.

Figure 4:
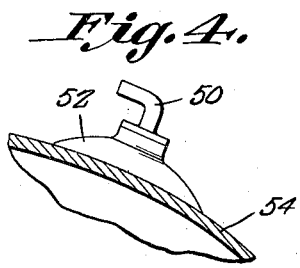
Figure 4 is a view of a modified form of attaching pin for the shield.

Figure 4 illustrates a modified pin 50 corresponding to the pin 22, wherein a suction cup 52 is provided for connection with the vehicle wall 54 in lieu of the screw thread connection of Figure 2.

In vehicle constructions devoid of an exteriorly projecting hinge, such as that illustrated at 42, pins 22 or 50 may be attached to the vehicle body for connection with the loops 40.

Without further elaboration, the foregoing will so fully illustrate my invention, that others may, by applying current knowledge, readily adapt the same for use under various conditions of service.

I claim:

1. The combination of an automotive vehicle having a windshield and exteriorly projecting door hinges located on opposite sides of the vehicle beneath the windshield, pins on said vehicle above said windshield, a shield for covering the windshield having eyes for the reception of said pins, tensioned loop members attached to said shield having loops engageable over said hinges and coacting with said pins to hold the shield in a taut condition across the windshield, said members including tension springs, and covering for said springs.

2. The combination of an automotive vehicle having a windshield, pins on said vehicle above the windshield, projections on opposite sides of the vehicle beneath said windshield, a shield for covering the windshield and having eyes for the reception of said pins, tensioned loop members attached to said shield and having loops engageable over said projections and coacting with said pins to hold the shield in a taut condition across the windshield, at least one of said members including a tension spring, and a covering for the spring.

ARTHUR P. DILLOW.